United States Patent
Li

(10) Patent No.: US 10,035,032 B2
(45) Date of Patent: Jul. 31, 2018

(54) THERMAL MANAGEMENT AND AUTOMATIC FIRE-EXTINGUISHING SYSTEM OF VEHICLE BATTERY

(71) Applicants: ZHEJIANG GEELY AUTOMOBILE RESEARCH INSTITUTE CO., LTD, Taizhou (CN); ZHEJIANG GEELY HOLDING GROUP CO., LTD, Hangzhou (CN)

(72) Inventor: Shufu Li, Hangzhou (CN)

(73) Assignees: ZHEJIANG GEELY AUTOMOBILE RESEARCH INSTITUTE CO., LTD., Taizhou (CN); ZHEJIANG GEELY HOLDING GROUP CO., LTD., Hangzhou (CN)

( * ) Notice: Subject to any disclaimer, the term of this patent is extended or adjusted under 35 U.S.C. 154(b) by 35 days.

(21) Appl. No.: 15/115,556

(22) PCT Filed: Dec. 23, 2014

(86) PCT No.: PCT/CN2014/094691
§ 371 (c)(1),
(2) Date: Jul. 29, 2016

(87) PCT Pub. No.: WO2015/120742
PCT Pub. Date: Aug. 20, 2015

(65) Prior Publication Data
US 2017/0165513 A1    Jun. 15, 2017

(30) Foreign Application Priority Data
Feb. 13, 2014 (CN) .......................... 2014 1 0049698

(51) Int. Cl.
*A62C 3/16* (2006.01)
*A62C 3/07* (2006.01)
(Continued)

(52) U.S. Cl.
CPC .................. *A62C 3/16* (2013.01); *A62C 3/07* (2013.01); *A62C 35/10* (2013.01); *B60L 3/0046* (2013.01);
(Continued)

(58) Field of Classification Search
CPC .. A62C 3/16; A62C 3/07; A62C 35/10; B60L 3/0046; B60L 11/187; H01M 10/486
(Continued)

(56) References Cited

U.S. PATENT DOCUMENTS 4,329,407 A * 5/1982 Gross .................. F28D 15/0275
429/101
6,106,972 A * 8/2000 Kokubo .............. B60L 11/1874
429/120

(Continued)

FOREIGN PATENT DOCUMENTS

| CN | 1996640 A | 7/2007 |
|---|---|---|
| CN | 101740840 A | 6/2010 |

(Continued)

OTHER PUBLICATIONS

International Search Report of the International Searching Authority for Application No. PCT/CN2014/094691, dated Mar. 25, 2015.
(Continued)

*Primary Examiner* — Darren W Gorman
*Assistant Examiner* — Joseph A Greenlund
(74) *Attorney, Agent, or Firm* — Alston & Bird LLP

(57) ABSTRACT

The present invention provides a thermal management and automatic fire-extinguishing system of a vehicle battery, used for managing the vehicle battery in a hybrid vehicle or an electric vehicle, including: fire-extinguishing packages which are adjacent to or in contact with the vehicle battery, wherein the fire-extinguishing package is filled with a fire-extinguishing agent; and the fire-extinguishing package is
(Continued)

configured to be opened when the temperature of the vehicle battery is higher than a preset temperature, so that the fire-extinguishing agent can be released and then filled into a space where the vehicle battery is located, thereby achieving the effects of automatic combustion prevention and fire extinguishing of the vehicle battery, effectively protecting the vehicle battery and the whole vehicle, reserving more escape time for passengers and improving the safety of the vehicle. On the whole, the thermal management and automatic fire-extinguishing system of the vehicle battery of the present invention is simple and reliable in structure, low in cost and strong in universality, and can be directly mounted on the vehicle without reforming the existing vehicle battery cooling system.

7 Claims, 5 Drawing Sheets

(51) Int. Cl.
    *A62C 35/10*      (2006.01)
    *B60L 11/18*      (2006.01)
    *B60L 3/00*      (2006.01)
    *H01M 10/48*      (2006.01)
    *A62C 99/00*      (2010.01)

(52) U.S. Cl.
    CPC ......... *B60L 11/187* (2013.01); *B60L 11/1874* (2013.01); *B60L 11/1875* (2013.01); *H01M 10/486* (2013.01); *A62C 99/0009* (2013.01); *B60L 2240/545* (2013.01); *H01M 2200/10* (2013.01); *H01M 2220/20* (2013.01); *Y02T 10/7005* (2013.01); *Y02T 10/705* (2013.01)

(58) Field of Classification Search
    USPC .......................................................... 169/62
    See application file for complete search history.

(56) References Cited

U.S. PATENT DOCUMENTS

| | | | | |
|---|---|---|---|---|
| 7,488,546 | B2* | 2/2009 | Kim | H01M 10/4207 320/150 |
| 8,530,069 | B2* | 9/2013 | Wood | B60L 11/1874 429/120 |
| 8,663,828 | B2* | 3/2014 | Payne | H01M 10/486 429/120 |
| 8,733,465 | B1* | 5/2014 | Flood | A62C 3/16 169/26 |
| 9,530,994 | B2* | 12/2016 | Pierre | H01M 2/1077 |
| 2009/0176148 | A1* | 7/2009 | Jiang | H01M 6/5038 429/120 |
| 2010/0078182 | A1* | 4/2010 | Alkemade | A62C 37/40 169/45 |
| 2012/0048577 | A1* | 3/2012 | Ball | A62C 3/00 169/46 |
| 2012/0263885 | A1* | 10/2012 | Koeckert | G02B 5/0858 427/535 |
| 2012/0312562 | A1* | 12/2012 | Woehrle | A62D 1/0064 169/46 |
| 2014/0060859 | A1* | 3/2014 | Kountz | H01M 2/1094 169/46 |
| 2014/0138103 | A1* | 5/2014 | Lee | A62C 3/16 169/45 |

FOREIGN PATENT DOCUMENTS

| | | |
|---|---|---|
| CN | 102461354 A | 5/2012 |
| CN | 202353190 U | 7/2012 |
| CN | 202366355 U | 8/2012 |
| CN | 202662693 U | 1/2013 |
| CN | 103566508 A | 2/2014 |
| CN | 103825059 A | 5/2014 |

OTHER PUBLICATIONS

Written Opinion of the International Searching Authority for Application No. PCT/CN2014/094691, dated Mar. 25, 2015.

\* cited by examiner

THERMAL MANAGEMENT AND AUTOMATIC FIRE-EXTINGUISHING SYSTEM OF VEHICLE BATTERY

FIELD OF THE INVENTION

The present invention relates to a vehicle battery protection technology in hybrid vehicles or electric vehicles, particularly to a thermal management and automatic fire-extinguishing system of a vehicle battery.

BACKGROUND OF THE INVENTION

For vehicles of which the power is all or partially provided by vehicle batteries, for example, pure electric vehicles or some types of hybrid vehicles, high capacity vehicle batteries generally need to be arranged in the vehicles to provide enough instantaneous power and endurance mileages as long as possible.

The vehicle battery will generate heat at work, an over high temperature will directly influence the working performance and the service life of the batteries, and even generates overheating, electrolyte overflow, fire, explosion and other potential safety accident hazards. In order to ensure the safety of the vehicle battery, vehicle and battery manufacturers spare no effort to adopt various measures, for example, the design of various anti-collision structures, the selection of flame retardant materials, the arrangement of the vehicle battery in a relatively safe position and the safety protection of the vehicle battery based on control strategies. However, once the vehicle battery is on fire, the above measures are basically invalid. Therefore, when the vehicle battery is in danger, how to ensure the safety of the vehicle battery and the vehicle to provide enough escape time for passengers and the like is particularly important.

A relatively good solution is to arrange a cooling system for cooling the vehicle battery, and use the cooling system to extinguish fire in the case of overheat and fire of the vehicle battery resulting from collision or short circuit or some other incompletely controllable reasons. As to this solution, however, cooling liquid of the cooling system needs to simultaneously have the cooling effect and the fire-extinguishing function on the vehicle battery, so that the requirements on the material of the cooling liquid are relatively high. Moreover, if the cooling system simultaneously has the cooling effect and the fire-extinguishing function on the vehicle battery, the existing cooling system needs to be reformed, thereby resulting in that the overall solution is relatively complicated.

SUMMARY OF THE INVENTION

The object of the present invention is to provide a thermal management and automatic fire-extinguishing technology of vehicle batteries, which is a simple and convenient solution.

Particularly, the present invention provides a thermal management and automatic fire-extinguishing system of a vehicle battery, used for managing the vehicle battery in a hybrid vehicle or an electric vehicle, including:

fire-extinguishing package(s) adjacent to or in contact with the vehicle battery, and filled with a fire-extinguishing agent; and wherein the fire-extinguishing package is configured to be opened when the temperature of the vehicle battery is higher than a preset temperature, so that the fire-extinguishing agent can be released out and then filled into a space where the vehicle battery is located.

Further, the fire-extinguishing packages includes an upper fire-extinguishing package and a lower fire-extinguishing package, wherein the upper fire-extinguishing package covers on the upper surface of each vehicle battery and a battery module composed of the vehicle batteries, and the lower fire-extinguishing package covers on the lower surface of each vehicle battery and the battery module composed of the vehicle batteries.

Further, the material of at least a part of the upper fire-extinguishing package is plastic or resin, and when the temperature of the vehicle battery is higher than the preset temperature, the at least a part of the upper fire-extinguishing package is heated by the vehicle battery into a fluid state, so that the fire-extinguishing agent can be released out and then filled into the space where the vehicle battery is located.

Further, the melting point of the material of the at least a part of the upper fire-extinguishing package is selected within a range of 85-95° C., and the melting point of the material of the lower fire-extinguishing package is higher than the melting point of the material of the at least a part.

Further, the upper fire-extinguishing package and the lower fire-extinguishing package are communicated with each other, and the upper fire-extinguishing package is connected with a pump in parallel, and the fire-extinguishing agent in the upper fire-extinguishing package can be pumped by the pump so as to heat or cool the battery module; and the lower fire-extinguishing package is connected with the pump in parallel, and the fire-extinguishing agent in the lower fire-extinguishing package can be pumped by the pump so as to heat or cool the battery module.

Further, the plastic is EVA plastic, and the resin is an ABS/PC alloy.

Further, the fire-extinguishing agent is silicone oil or transformer oil.

Further, the thermal management and automatic fire-extinguishing system of the vehicle battery further includes an upper cover and a lower cover, which are deployed at a battery package box body. When the upper cover is opened, the upper fire-extinguishing package can be put to cover on the battery module or be detached away from the battery module, and when the lower cover is opened, the lower fire-extinguishing package can be put to cover on the battery module or be detached away from the battery module.

Further, the thermal management and automatic fire-extinguishing system of the vehicle battery further includes an insulating layer arranged on a circuit connecting plate between the battery modules and/or on a connecting wire between the battery modules and electric elements.

Further, the insulating layer is made of acrylic resin.

According to the thermal management and automatic fire-extinguishing system of the vehicle battery of the present invention, when the temperature of the vehicle battery is higher than the preset temperature, the fire-extinguishing package will be opened, so that the fire-extinguishing agent filled in the fire-extinguishing package can be released out and then filled into the space where the vehicle battery is located. In this way, when the vehicle battery is on fire and burnt due to collision, short circuit or other abnormal reasons, the fire-extinguishing agent in the fire-extinguishing package can be released and then filled into the space where the vehicle battery is located to extinguish the fire, thereby achieving the effects of automatic combustion prevention and fire extinguishing of the vehicle battery, effectively protecting the vehicle battery and the whole vehicle, reserving more escape time for passengers and improving the safety of the vehicle. On the whole, the thermal management and automatic fire-extinguishing system of the vehicle battery of the present invention is simple and reliable in structure, low in cost and strong in universality, and can be directly mounted on the vehicle without reforming the existing vehicle battery cooling system. According to the thermal management and automatic fire-extinguishing system of the vehicle battery of the present invention, further, the fire-extinguishing packages are arranged on the upper and lower surfaces of the vehicle battery or the battery module, and besides the fire-extinguishing function provided by the fire-extinguishing agent in the fire-extinguishing package, the fire-extinguishing packages themselves can fix or buffer the vehicle battery or the battery module.

According to the thermal management and automatic fire-extinguishing system of the vehicle battery of the present invention, further, the upper fire-extinguishing package and the lower fire-extinguishing package covering on the upper and lower surfaces of the battery module can not only play a fire-extinguishing function, moreover, since the upper fire-extinguishing package and the lower fire-extinguishing package are connected with the pump in parallel, the fire-extinguishing agent in the upper fire-extinguishing package and the lower fire-extinguishing package can regulate the temperature of the vehicle battery or the battery module together by means of the pumping of the pumps, so as to heat or cool the battery module to an appropriate working temperature. Moreover, due to the parallel connection mode, even if the fire-extinguishing agent in a few upper fire-extinguishing package or lower fire-extinguishing package flows out due to unexpected crack of packages, the fire-extinguishing and temperature regulation functions of other fire-extinguishing packages are not interrupted. Moreover, according to demand, when the upper fire-extinguishing package can play an enough upper fire-extinguishing function, the lower fire-extinguishing package can only play the temperature regulation function and does not need to crack to release the fire-extinguishing agent, and in this situation, the requirements on the material of the lower fire-extinguishing package can be greatly reduced.

A detailed description of specific embodiments of the present invention will be given below in combination with drawings, and thus those skilled in the art will better understand the above and other purposes, advantages and features of the present invention.

BRIEF DESCRIPTION OF THE DRAWINGS

Some specific embodiments of the present invention will be described below exemplarily rather than restrictively with reference to drawings. Identical reference signs in the drawings refer to identical or similar components or parts. Those skilled in the art should understand that, these drawings are not necessarily drawn to scale. In the drawings.

DETAILED DESCRIPTION OF THE EMBODIMENTS

The embodiment of the present invention provides a thermal management and automatic fire-extinguishing system of a vehicle battery 10, used for managing the vehicle battery 10 in a hybrid vehicle or an electric vehicle. The thermal management and automatic fire-extinguishing system of the vehicle battery includes fire-extinguishing packages 20, the fire-extinguishing packages 20 are adjacent to or in contact with the vehicle battery 10, and the fire-extinguishing packages 20 are filled with a fire-extinguishing agent. When the temperature of the vehicle battery 10 is higher than a preset temperature, the fire-extinguishing package 20 is opened, so that the fire-extinguishing agent can be released and then filled into a space where the vehicle battery 10 is located. Herein, being adjacent or in contact depends on the sensitiveness of the material of the fire-extinguishing package to the preset temperature. In this way, when the vehicle battery 10 is on fire and burnt due to collision, short circuit or other abnormal reasons, the fire-extinguishing agent in the fire-extinguishing package 20 can be released out and then filled into the space where the vehicle battery 10 is located to extinguish the fire, thereby achieving the effects of automatic combustion prevention and fire extinguishing of the vehicle battery 10, effectively protecting the vehicle battery 10 and the whole vehicle, reserving more escape time for passengers and improving the safety of the vehicle. According to the embodiment, the thermal management and automatic fire-extinguishing system of the vehicle battery 10 of the present invention is simple and reliable in structure, low in cost and strong in universality, and is independent from the existing vehicle battery cooling system, and thus the existing vehicle battery cooling system does not need to be reformed.

Figure 1:
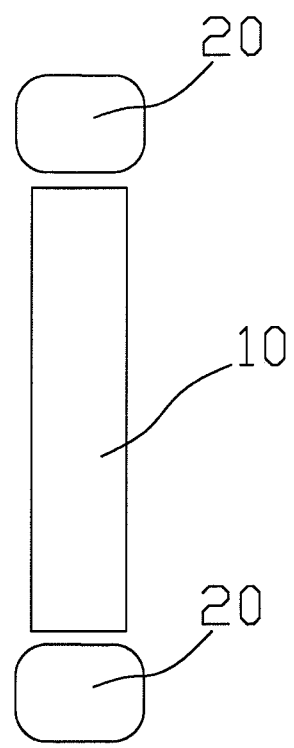
FIG. 1 is a schematic diagram of a position relation of a fire-extinguishing package and a vehicle battery in a thermal management and automatic fire-extinguishing system of the vehicle battery according to one embodiment of the present invention.

FIG. 1 shows a schematic diagram of a position relation of the fire-extinguishing package 20 and the vehicle battery 10 according to one embodiment of the present invention, and in the embodiment, the fire-extinguishing package 20 is used for extinguishing the fire of a single vehicle battery 10. In this way, each vehicle battery 10 has a corresponding fire-extinguishing package 20, and when the temperature of the vehicle battery 10 is higher than the preset temperature, the corresponding fire-extinguishing package 20 is opened, so that the fire-extinguishing agent can be released and then filled into the space where the vehicle battery 10 is located in order to accurately extinguish the fire.

Figure 2:
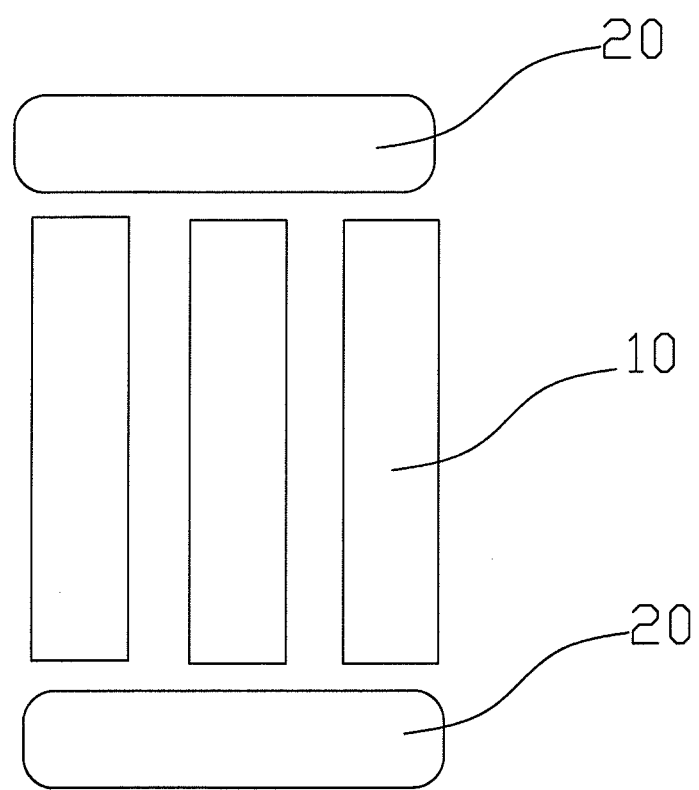
FIG. 2 is a schematic diagram of a position relation of a fire-extinguishing package and a battery module in a thermal management and automatic fire-extinguishing system of a vehicle battery according to another embodiment of the present invention.

It can be understood that, for a hybrid vehicle or an electric vehicle, the vehicle batteries 10 are generally arranged in a battery package box body 100 and are connected with each other by a circuit connecting plate to form a battery module, and the vehicle battery 10 per se may be a single battery or a battery pack composed of a plurality of individual batteries. FIG. 2 is a schematic diagram of a position relation of a fire-extinguishing package and a battery module in a thermal management and automatic fire-extinguishing system of a vehicle battery according to another embodiment of the present invention, and in the embodiment, the fire-extinguishing package 20 is used for extinguishing the fire of the battery module composed of the vehicle batteries 10. FIG. 2 exemplarily shows a battery module composed of three vehicle batteries 10 and an upper fire-extinguishing package and a lower fire-extinguishing package corresponding to the battery module, and the preset temperature set for the battery module may be the same with it for the vehicle batteries 10. In other embodiments, more or less vehicle batteries 10 may also be arranged for forming the battery module. Alternatively, in other embodiments, more fire-extinguishing packages 20 corresponding to one battery module may also be arranged and may be arranged in other manners different from that in FIG. 2, for example, being arranged adjacent to side walls of the vehicle batteries 10 of one battery module. The comparison between FIG. 1 and FIG. 2 shows that, according to the thermal management and automatic fire-extinguishing system of the vehicle battery of the present invention, each vehicle battery 10 or each battery module has a corresponding fire-extinguishing package 20, and when the temperature of the vehicle battery 10 or the battery module is higher than the preset temperature, the corresponding fire-extinguishing package 20 is opened, so that the fire-extinguishing agent can be released and then filled into the space where the vehicle battery 10 or the battery module is located to extinguish the fire of the vehicle battery 10 or the battery module.

Figure 3:
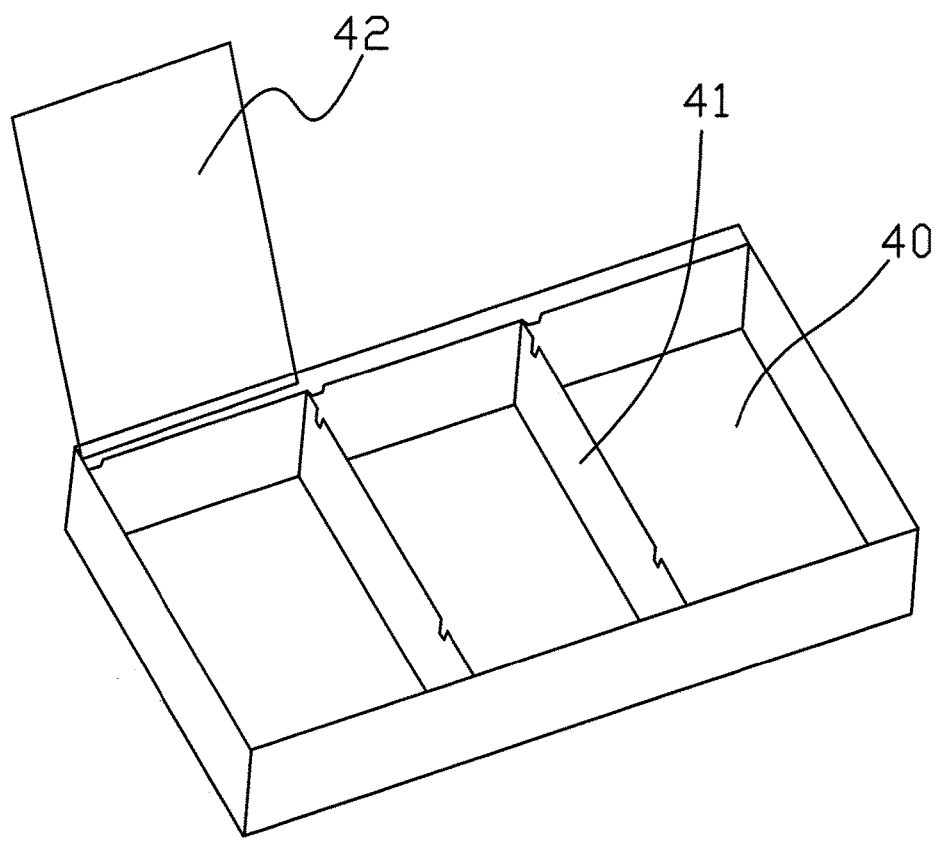
FIG. 3 is a schematic diagram of a battery package box body according to one embodiment of the present invention.

FIG. 3 is a schematic diagram of a battery package box body 100 according to one embodiment of the present invention. In FIG. 3, the battery package box body 100 includes three battery module mounting areas 40, and each battery module mounting area 40 is composed of a battery module fixing plate 41, an upper cover 42 and a lower cover (not shown).

Figure 4:
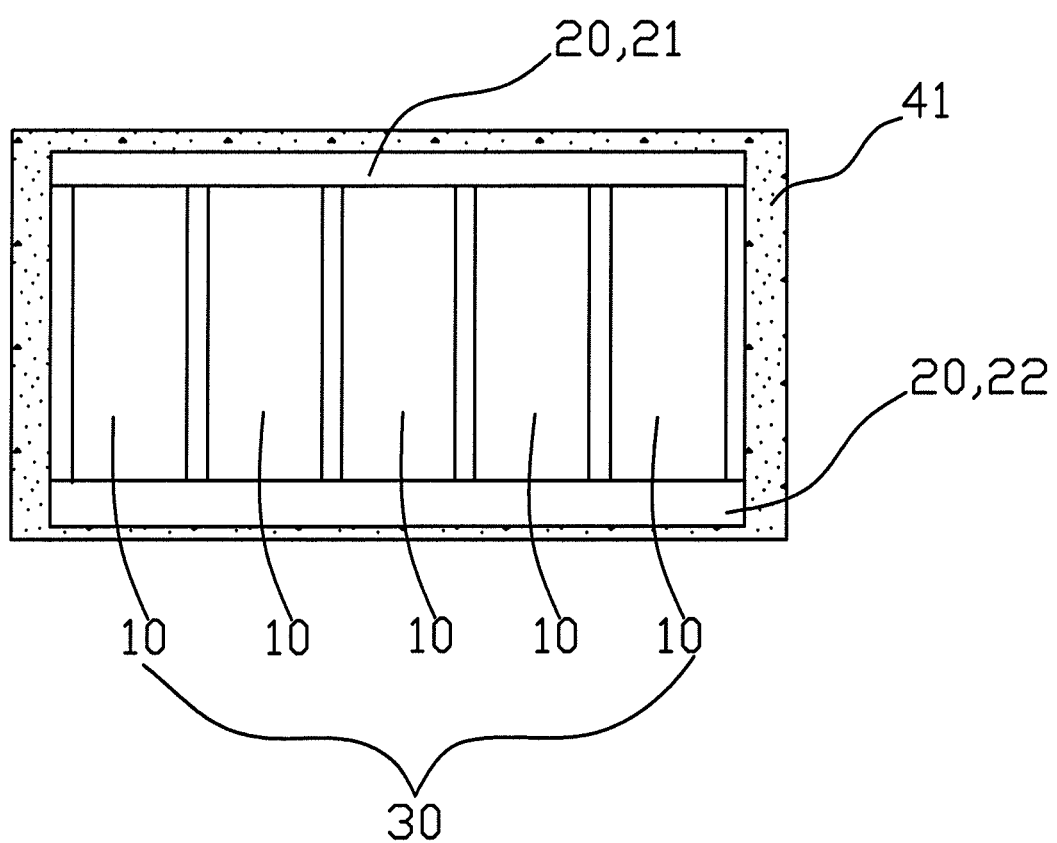
FIG. 4 is a schematic diagram of a position relation of a battery module and a fire-extinguishing package in a battery module mounting area according to one embodiment of the present invention.

FIG. 4 shows a schematic diagram of a position relation of the battery module 30 and the fire-extinguishing package 20 in a battery module mounting area 40. As shown in FIG. 4, the battery module 30 composed of five vehicle batteries 10 is included in the battery module mounting area 40, an upper fire-extinguishing package 21 is directly connected between the battery module 30 and the upper cover 42, and a lower fire-extinguishing package 22 are directly connected between the battery module 30 and the lower cover. The upper fire-extinguishing package 21 and the lower fire-extinguishing package 22 arranged herein can not only quickly sense the temperature of the battery module 30 to release the fire-extinguishing agent for extinguishing fire or cooling, but also can effectively fix or buffer the battery module 30, so that the fire risk of the battery module 30 caused by vehicle collision can be reduced, and up and down movement of the battery module 30 as a whole caused by vehicle jolt can be reduced. In the design, when the temperature of the battery module 30 is higher than the preset temperature, at least one of the upper fire-extinguishing package 21 and the lower fire-extinguishing package 22 is opened, so that the fire-extinguishing agent in the fire-extinguishing package can be released and then filled into the space where the entire battery module 30 is located. In other embodiments, the fire-extinguishing packages 20 can be directly connected between each vehicle battery 10 of the battery module 30 and the upper cover 42 and between each vehicle battery 10 of the battery module 30 and the lower cover, so as to relieve the up and down movement of the corresponding vehicle battery 10 caused by vehicle jolt. When the temperature of the vehicle battery 10 is higher than the preset temperature, the fire-extinguishing package 20 is opened, so that the fire-extinguishing agent in the fire-extinguishing package 20 can be released and then filled into the space where the vehicle battery 10 is located, while the other fire-extinguishing packages 20 do not release the fire-extinguishing agent. In this way, the fire-extinguishing package 20 can more accurately release the fire-extinguishing agent for the single vehicle battery 10 whose temperature is higher than the preset temperature.

Return to FIG. 3, in FIG. 3, the upper cover 42 is used for covering one battery module 30. In other embodiments, the size of the upper cover 42 can be increased to cover the upper surface of the entire battery package box body 100. When the upper cover 42 is opened, the upper fire-extinguishing package 21 can be put to cover on the upper surface of the battery module 30 or detached from the upper surface of the battery module 30. When the lower cover is opened, the lower fire-extinguishing package 22 can be put to cover on the lower surface of the battery module 30 or detached from the lower surface of the battery module. Due to the design of the upper cover 42 and the lower cover, the fire-extinguishing package 20 can be conveniently changed in time.

In the embodiment as shown in FIG. 4, the contact site of the upper fire-extinguishing package 21 with the vehicle battery 10, namely the bottom of the upper fire-extinguishing package 21, is made of plastic or resin, and in other embodiments, the upper fire-extinguishing package 21 can also be entirely made of plastic or resin. The plastic or resin is selected herein, because the proper plastic and resin have lower melting points. Only as an exemplary example, when the material of at least a part of the upper fire-extinguishing package 21 is plastic, the plastic is EVA plastic, and the melting point of the EVA plastic can be maintained at about 90° C. via proper additive. Only as an exemplary example, when the material of at least a part of the upper fire-extinguishing package 21 is resin, the resin is an ABS/PC alloy. The ABS/PC alloy has good mechanical strength and toughness, thereby being capable of preventing the self crack of the upper fire-extinguishing package 21 caused by collision. Meanwhile, the ABS/PC alloy has flame retardance, thereby being very suitable for manufacturing the upper fire-extinguishing package 21 of the present invention. When the temperature of the battery module 30 is higher than the preset temperature, at least a part of the upper fire-extinguishing package 21, for example, the bottom of the upper fire-extinguishing package 21 in FIG. 2, is heated by the battery module 30 to a fluid state, so that the fire-extinguishing agent in the fire-extinguishing package can be released and then filled into the space where the battery module 30 is located. Herein, the preset temperature can be set according to the judgment standard of those skilled in the art on the fire risk of the vehicle battery 10, and, for example, can be selected within a range of 85-95° C. The plastic or the resin is selected as materials with a low melting point, and the melting point can be determined according to the foregoing preset temperature, so that the plastic or the resin can be heated to the fluid state to enable the fire-extinguishing agent to flow out when the temperature of the battery module 30 exceeds the preset temperature. In one embodiment of the present invention, the melting point of the material of at least a part of the upper fire-extinguishing package 21 is within a range of 85-95° C., thereby matching the temperature at which the battery module 30 has the fire risk. Of course, in other embodiments, the melting point of the material of at least a part of the upper fire-extinguishing package 21 can also be determined according to the temperatures at which different battery modules 30 have the fire risk.

Figure 5:
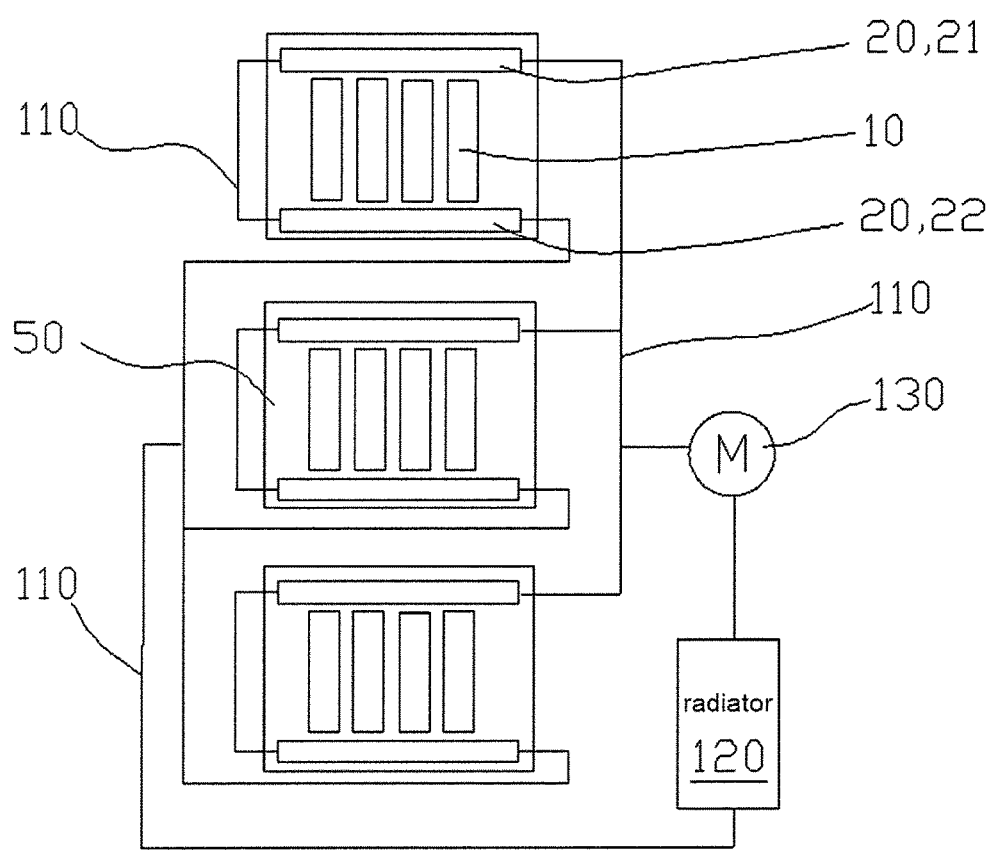
FIG. 5 is a schematic diagram of a principle according to one embodiment of the present invention.

In the embodiment as shown in FIG. 4 and FIG. 5, the lower fire-extinguishing package 22 is mainly used for cooling the battery module 30, so that the lower fire-extinguishing package 22 herein can be made of a material with a relatively high melting point. Or, the lower fire-extinguishing package 22 herein has a cooling effect and the fire-extinguishing function just like the upper fire-extinguishing package 21, and at this time, the melting point of the material of the lower fire-extinguishing package 22 is slightly higher than the melting point of the material of at least a part of the upper fire-extinguishing package 21. When the temperature of the battery module 30 is higher than the preset temperature, the upper fire-extinguishing package 21 is opened to extinguish the fire, the lower fire-extinguishing package 22 cools the vehicle battery 10, and if the temperature continuously rises to the melting point of the material of the lower fire-extinguishing package 22, the lower fire-extinguishing package 22 cracks to extinguish the fire. The cooling effect of the lower fire-extinguishing package 22 will be described below in detail.

Since silicone oil or transformer oil has good flame retardance and insulation properties at normal temperature and normal pressure, the silicone oil or transformer oil is selected to serve as the fire-extinguishing agent in the present invention. In the case that the fire-extinguishing agent contains impurities or that the fire-extinguishing agent itself is a conductive material, when the fire-extinguishing agent is released and then filled into the space where the battery module 30 is located, instable power supply or fire caused by short circuit of the battery module 30 may be induced. Therefore, in order to reduce the requirements on the purity of the fire-extinguishing agent and the electrical conductivity of the material, in one preferred embodiment of the present invention, insulating layers are arranged on a circuit connecting plate between the battery modules 30 and on a connecting wire between the battery module 30 and an electric element. If the circuit connecting plate itself has an anti-conductive measure, the insulating layer may also be only arranged on the connecting wire, or if the connecting wire is a varnished wire with an anti-conductive function, the insulating layer may be only arranged on the circuit connecting plate. Since acrylic resin has very good temperature resistance, excellent insulation and corrosion resistance property, in one embodiment, the insulating layer is made of the acrylic resin. In other embodiments, the insulating layer may also be made of polyesterimide or polyimide and other materials with insulating property.

FIG. 5 is a schematic diagram of a principle of the present invention. As shown in FIG. 5, the thermal management and automatic fire-extinguishing system of the vehicle battery of the present invention can further include a cooling loop 110, a radiator 120 and a pump 130. In each battery package 50, the cooling loop 110 communicates the upper fire-extinguishing package 21 with the lower fire-extinguishing package 22, and the cooling loop 110 communicates different battery packages 50. The fire-extinguishing agent in the cooling loop 110 may flow in the cooling loop 110 to serve as a cooling medium, so as to absorb the heat dissipated by the battery module 30 and take the heat to the outside of the battery package 50 for dissipating the heat. The temperature of the cooling medium rises due to absorbing the heat at the battery module 30, and then the cooling medium is transmitted by the cooling loop 110 to the radiator 120 at the outside of the battery package 50 and exchanges heat with medium such as air, so as to dissipate the heat and cool down. Thus, the battery module 30 can be cooled again by the cooling medium through the cooling loop 110. With the rising of the temperature of the battery module 30, the pump 130 works more quickly to accelerate the flow of the fire-extinguishing agent in the upper fire-extinguishing package 21 and the lower fire-extinguishing package 22 to cool the battery module 30. In the embodiment as shown in FIG. 5, the cooling medium can be stored in the radiator 120 and is pumped by the pump 130 into the cooling loop 110, and then the cooling medium circularly flows in the cooling loop 110. Although the cooling system 100 is mainly used for cooling the battery module 30, it can be understood that, a heater used for heating the cooling medium can also be arranged in the cooling loop 110, so as to heat the cooling medium to enable the battery module 30 to reach the proper working temperature thereof as soon as possible in the case of cold start of the vehicle and other circumstances.

In a preferred embodiment, the thermal management and automatic fire-extinguishing system of the vehicle battery according to the present invention may further include a fire monitoring device and a controller. The fire monitoring device is used for monitoring the fire or fire risk of the battery module 30. When the fire monitoring device monitors the fire or fire risk of the battery module 30, the controller enables the lower fire-extinguishing package 22 to execute or accelerate the cooling effect to extinguish or prevent the fire. The controller may be realized by a battery management system (BMS). When at work, the battery management system monitors the temperature of the battery module 30 and the pressure in the upper fire-extinguishing package 21 respectively by a temperature sensor and a pressure sensor in real time. When the temperature of the battery module 30 exceeds the preset temperature and the pressure in the upper fire-extinguishing package 21 is obviously reduced, the battery management system judges that the battery module 30 is on fire or has a relatively large fire risk at this time, and the upper fire-extinguishing package 21 might have started being fluidized to release the fire-extinguishing agent. At this time, the battery management system may send a request signal to a whole vehicle controller, the whole vehicle controller responds to the request signal to control the pump 130 to work more quickly to accelerate the flow of the fire-extinguishing agent in the lower fire-extinguishing package 22, so as to cool the battery module 30. In another embodiment, only the pressure sensor or the temperature sensor may be used as the fire monitoring device, and at this time, whether the battery module 30 is on fire or has the fire risk may be judged according to the temperature of the battery module 30 or the pressure in the upper fire-extinguishing package 21. In other embodiments, other proper monitoring devices, for example, a flame monitoring device, may also be used as the fire monitoring device herein.

In a preferred embodiment, when the upper fire-extinguishing package 21 is used for extinguishing the fire of a single vehicle battery 10, a temperature sensor is arranged on each vehicle battery 10, and a pressure sensor is arranged in each upper fire-extinguishing package 21. In another embodiment, when the upper fire-extinguishing package 21 is used for extinguishing the fire of the battery module 30, a temperature sensor is arranged on each vehicle battery 10, and a pressure sensor is arranged in each upper fire-extinguishing package 21. Alternatively, a temperature sensor is arranged on each battery module 30, a pressure sensor is arranged in each upper fire-extinguishing package 21 for monitoring the temperature of each vehicle battery 10 in the battery module. In another embodiment, when the upper fire-extinguishing package 21 is used for extinguishing the fire of the battery module 30, two types of temperature sensors are provided, wherein one of the two types is a total temperature sensor and is used for monitoring the temperature of all vehicle batteries 10 in the battery module, and the other type of temperature sensor is auxiliary temperature sensors each of which is arranged on a corresponding vehicle battery 10 and is used for monitoring the temperature of the corresponding vehicle battery 10 in the battery module 30. Only when the temperatures monitored by the total temperature sensor and at least one auxiliary temperature sensor monitor exceed the preset temperature, it is regarded as one of fire judging criterions of the battery module 30, and thus the condition that the total temperature sensor or the auxiliary temperature sensor is faulty to get an over high monitored temperature may be prevented. Alternatively, when the temperature of the vehicle battery 10 monitored by the total temperature sensor or at least one auxiliary temperature sensor monitor exceeds the preset temperature, it is regarded as one of the judging criterions of the vehicle battery 10, and thus the condition that the total temperature sensor or the auxiliary temperature sensor is faulty and cannot work can be prevented. According to the monitored fire criterions, if simultaneously having monitored that the pressure in the upper fire-extinguishing package 21 is obviously reduced, the battery management system judges that the vehicle battery 10 is on fire or has a relatively high fire risk, and the upper fire-extinguishing package 21 might have started being fluidized to release the fire-extinguishing agent to the outside. In FIG. 2, since hot air flows upwards, the upper fire-extinguishing package 21 arranged on the upper surface of the vehicle battery 10 can effectively absorb heat to play a main fire-extinguishing effect. Moreover, since a large amount of fire-extinguishing agent is held in the upper fire-extinguishing package 21, even if the above-mentioned fire monitoring device and the controller cannot work normally, the upper fire-extinguishing package 21 itself can provide a large amount of fire-extinguishing agent after turning into the fluid state to self crack, so as to extinguish the fire or ease the fire to a certain extent. In one embodiment not shown in the figures, the thermal management and automatic fire-extinguishing system of the vehicle battery according to the present invention may further include a release mechanism, the upper fire-extinguishing package 21 is arranged in the release mechanism and is adjacent to the vehicle battery 10 or the battery module 30, and the "being adjacent" herein refers to that being different from the direct contact between the fire-extinguishing package 20 and the vehicle battery 10 in FIG. 1 and FIG. 2, the release mechanism is arranged between the upper fire-extinguishing package 21 and the vehicle battery 10 or the battery module 30. When the upper fire-extinguishing package 21 is heated to the fluid state, the fire-extinguishing agent therein will be released and then filled into the release mechanism, and the release mechanism selectively opens, so that the fire-extinguishing agent is indirectly released and then filled into the space where the vehicle battery 10 or the battery module 30 is located.

So far, those skilled in the art should understand that, although a plurality of exemplary embodiments of the present invention have been shown and described herein in detail, a lot of other variations or modifications conforming to the principle of the present invention can also be directly determined or derived according to the contents disclosed by the present invention, without departing from the spirit or scope of the present invention. Therefore, the scope of the present invention should be understood and deemed as encompassing all of these other variations or modifications.

The invention claimed is:

1. A thermal management and automatic fire-extinguishing system of a vehicle battery, used for managing the vehicle battery in a hybrid vehicle or an electric vehicle, comprising:

fire-extinguishing packages which are disposed adjacent to or in contact with the vehicle battery, and filled with a fire-extinguishing agent;

wherein the fire-extinguishing packages are configured to be opened when the temperature of the vehicle battery is higher than a preset temperature, so that the fire-extinguishing agent can be released and then filled into a space where the vehicle battery is located;

wherein the fire-extinguishing packages comprise an upper fire-extinguishing package and a lower fire-extinguishing package, the upper fire-extinguishing package wholly covers the upper surface of each vehicle battery or a battery module composed of the vehicle batteries, and the lower fire-extinguishing package wholly covers the lower surface of each vehicle battery or the battery module composed of the vehicle batteries;

wherein the upper fire-extinguishing package and the lower fire-extinguishing package are communicated with each other;

wherein the upper fire-extinguishing package is connected with a pump in parallel, the fire-extinguishing agent in the upper fire-extinguishing package, which is pumped by the pump, can heat or cool the battery module, and the lower fire-extinguishing package is connected with the pump in parallel, and the fire-extinguishing agent in the lower fire-extinguishing package, which is pumped by the pump, can heat or cool the battery module; and wherein the system further comprises an upper cover and a lower cover, which are disposed at a battery package box body, the upper fire-extinguishing package is directly connected between the battery module and the upper cover, and the lower fire-extinguishing package is directly connected between the battery module and the lower cover.

2. The system of claim 1, wherein the material of at least a part of the upper fire-extinguishing package is plastic or resin, and when the temperature of the vehicle battery is higher than the preset temperature, the at least a part of the upper fire-extinguishing package is heated by the vehicle battery into a fluid state, so that the fire-extinguishing agent can be released and then filled into the space where the vehicle battery is located.

3. The system of claim 2, wherein the melting point of the material of the at least a part of the upper fire-extinguishing package is selected within a range of 85-95° C., and the melting point of the material of the lower fire-extinguishing package is higher than the melting point of the material of the at least a part of the upper fire-extinguishing package.

4. The system of claim 2, wherein the plastic is EVA plastic, and the resin is an ABS/PC alloy.

5. The system of claim 1, wherein the fire-extinguishing agent is silicone oil or transformer oil.

6. The system of claim 1, further comprising an insulating layer arranged on a circuit connecting plate between the battery modules and/or on a connecting wire between the battery modules and electric elements.

7. The system of claim 6, wherein the insulating layer is made of acrylic resin.

* * * * *